United States Patent [19]
Getler et al.

[11] Patent Number: 5,773,061
[45] Date of Patent: Jun. 30, 1998

[54] METHOD AND APPARATUS FOR MAKING AGGLOMERATED PRODUCT

[75] Inventors: Jens Getler, Brønshøj; John Ib Hansen, Holte; Gert G. Andersen, Slangerup, all of Denmark

[73] Assignee: APV Anhydro A/S, Denmark

[21] Appl. No.: 564,205

[22] PCT Filed: Jun. 23, 1994

[86] PCT No.: PCT/DK94/00257

§ 371 Date: May 15, 1996

§ 102(e) Date: May 15, 1996

[87] PCT Pub. No.: WO95/00031

PCT Pub. Date: Jan. 5, 1995

[30] Foreign Application Priority Data

Jun. 24, 1993 [DK] Denmark ................................ 0752/93

[51] Int. Cl.⁶ .................................................. A23G 9/00
[52] U.S. Cl. ......................... 426/285; 426/312; 426/317; 426/588; 426/443; 426/453; 426/474; 426/491; 99/452; 34/377; 34/378; 34/379
[58] Field of Search .................. 426/285, 302, 426/312, 317, 580, 588, 443, 453, 456, 465, 474, 491; 34/374, 576, 372, 375, 376, 377, 378, 379, 102; 99/452

[56] References Cited

U.S. PATENT DOCUMENTS 2,835,586  5/1958  Peebles .................................... 426/588
3,385,724  5/1968  Grün .................................... 426/302 X
3,435,106  3/1969  Hager ...................................... 264/113
5,044,093  9/1991  Itoh et al. .............................. 34/57 R
5,100,509  3/1992  Pisecky et al. .......................... 159/4.2

FOREIGN PATENT DOCUMENTS 1 004 029  3/1957  Germany .

OTHER PUBLICATIONS

Dairy Industries International, "The World's Largest Powder Complex" (Oct., 1992).
Ullmann's Encyclopedia of Industrial Chemistry, Fifth Completely Revised Edition, vol. B2: Unit Operations I, pp. 7–21 thru 7–23 (1988).
Patent Abstracts of Japan, 8 (85), C–219 (Apr. 18, 1994) (abstract of JP–A–59–6931).

Primary Examiner—Milton Cano
Attorney, Agent, or Firm—Leydig, Voit & Mayer, Ltd.

[57] ABSTRACT

An agglomerated powder is produced in an apparatus where the product is agglomerated in two stages. First, a liquid concentrated feed of the product is atomized by an atomizer in a drying chamber. The fine particles are transferred to a separating device to be split up in a first and second fraction. The first of these is led to the atomizer in the drying chamber to perform a first agglomeration and the resulting agglomerates are accommodated in an external fluid be in the drying chamber and from this transferred to an external fluid bed. Also the second fraction is transferred to the external fluid bed where water by a second atomizer is atomized over a fluidized layer of agglomerates to perform a second agglomeration of product.

17 Claims, 1 Drawing Sheet

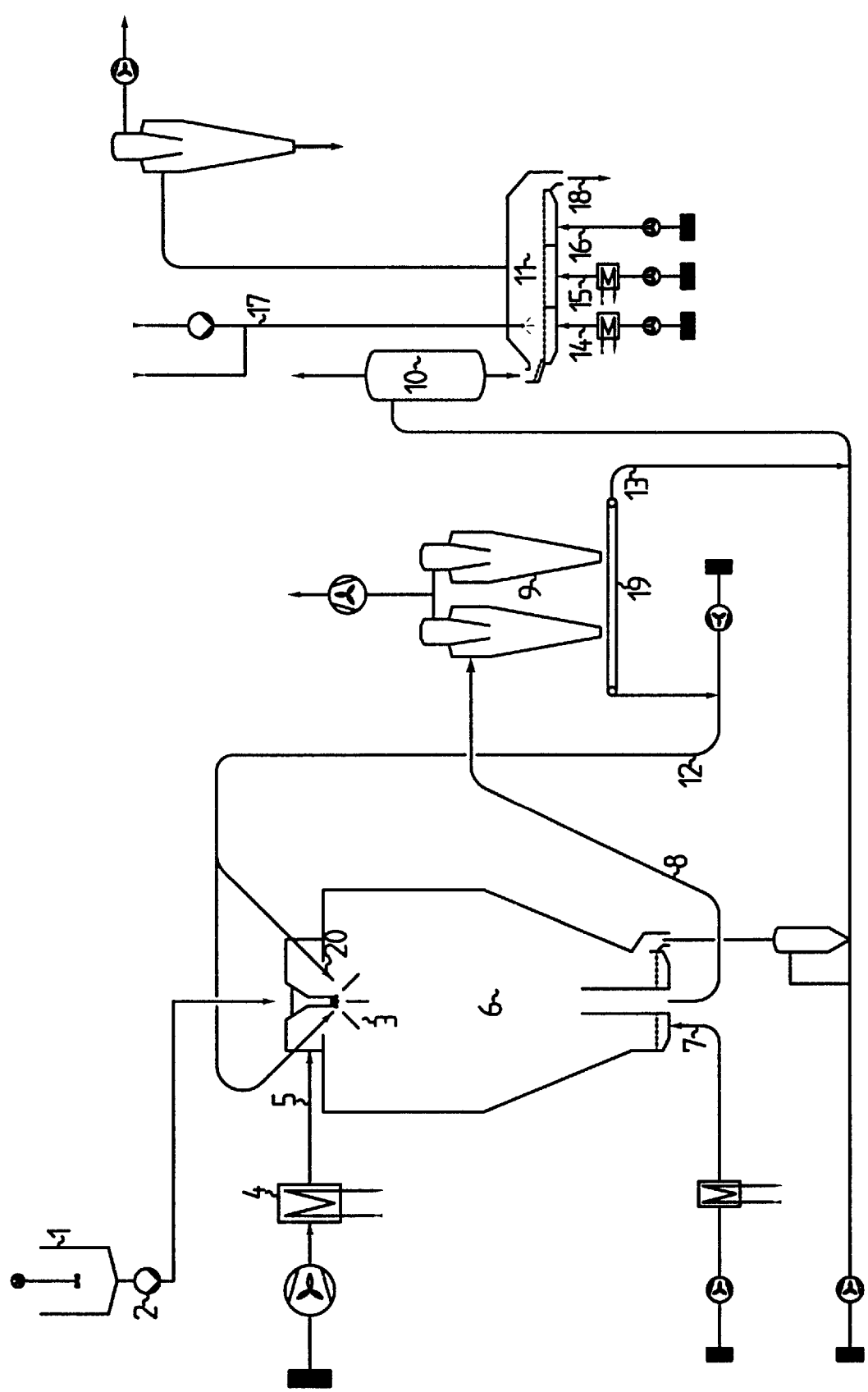

METHOD AND APPARATUS FOR MAKING AGGLOMERATED PRODUCT

The present invention relates to a method and a plant for the preparation of agglomerated milk products and milk-like products, e.g., baby food, in a two-stage agglomeration process comprising spray drying of a concentrated premix which is pre-agglomerated by return of fine particles to the atomizer and, in a subsequent step, post-agglomeration by wetting and drying in a fluidized bed.

The invention specifically relates to the manufacture of agglomerated baby foods known as infant formula and follow-up formula and to the manufacture of whey protein concentrates. The manufacturer of such products must be able to meet a number of requirements from authorities and from the end-users. The gross composition of such products is often controlled by local recommendations. However, in the case of baby food, the manufacturer may vary the individual constituents in a wide range to give a good resemblance of mother's milk or to add specific healthy ingredients. Therefore, the chemical composition of the before-mentioned milk and milk-like products may vary within wide limits.

Next, the agglomerated powders must satisfy a series of physical requests from the end-user, i.e. the powder must be immediately soluble in luke warm water, it must not cause any small lumps in the bottle, it must be easily and accurately dispensed, have a certain bulk density, be dust free, have a long shelf life etc.

Since the physical properties of an agglomerate are most dependent on the chemical composition, an apparatus for the manufacture of these milk-like products must be very flexible.

It is a well known process to manufacture a powdered baby food by spray drying a concentrated premix and agglomerating the powder by recirculating all fine particles to the atomizer. The obtained agglomerates are subsequently dried in a fluidized bed.

This process is e.g. explained by Haugaard Sorensen et al. in Scandinavian Dairy Information 4, 1992. The disadvantage of the process is that it is very difficult to avoid some formation of oversize particles which tend to form lumps when redissolved. In addition, the agglomerates produced in this way are very unstable.

Further, it is a known technique to manufacture agglomerated baby food by the so called re-wet agglomeration in which previously spray dried powders are wetted with 8–10% water in a special wetting chamber and dried in a separate fluid bed. This process, e.g. described by Masters, Spray Drying Handbook, 1985, p. 602, has the disadvantage of requiring high rates of water and corresponding additional drying, and it is claimed to be suitable for production of small agglomerates only.

Further, the applicant has for many years manufactured and sold re-wet agglomerators for agglomeration and drying of baby foods. This apparatus is a fluid bed in which one or several series of flat spray two-fluid nozzles are arranged transversely in a first section of a vibrated plug flow fluid bed. The nozzle slit is vertical. This agglomerator is flexible, however, has the disadvantage of also requiring 8–10% added water and a corresponding large area with warm air for drying out this water.

Further, it is known in the dairy industry to agglomerate milk and milk-like powder products in an integrated fluid bed spray dryer, using low outlet temperature. This agglomeration is claimed to take place mainly in the fluid bed. The fluid bed handles powder of high residual moisture which in the subsequent stage is removed in a traditional fluid bed dryer. (Masters, Spray Drying Handbook, 1991, pp. 615 and 597).

It is a common problem, using the prior art, that agglomeration of certain products in the milk industry and some milk-like baby food formulations is very difficult, especially if the liquid premix was atomized from a nozzle atomizer and that manufacture of stable, non dusty powders with customer requested functional properties requires substantial additional water evaporation and operator skill.

The present invention of a two-stage agglomeration process eliminates these drawbacks.

The concentrated liquid premix is spray dried in a conventional spray dryer with an internal non-vibrating fluid bed at the bottom.

In the first stage of agglomeration, only a controlled fraction of the fine particles from the spray dryer is recycled pneumatically to the wet zone around the atomizer while the rest of the fine particles is conveyed to the external fluid bed. The atomizer is a rotary disk type or a well known set-up of one or more pressure swirl nozzles. The controlled fraction of the fine particles is introduced through a set of tubes into the wet zone of atomized droplets at an adjustable velocity, allowing for an accurate control of the first stage of agglomeration.

In the second stage of agglomeration, water is atomized through flat spray two-fluid nozzles above a fluidized layer of the pre-agglomerated particles from the first stage. The fluid bed has down stream sections for final drying and for cooling before the powder is conveyed to packaging or silo.

It has been shown—as it will appear from the later on disclosed Examples 1–8—that a two-stage agglomeration, comprising recycling of a controlled fraction of fines to the atomizer at a controlled velocity and, in a continuous process, wetting by atomizing a small amount of water upon a fluidized layer of powder, has a number of unexpected advantages compared to prior art.

In the first stage, the agglomeration is fully controlled according to requirements for different formulations and end-users. This in turn means that the agglomeration in the first hand takes place around the atomizer, and preferably not in the internal fluid bed which is used for separation of the fine particles only. The first agglomeration has only a slight effect on particle size and particle size distribution. However, it has an effect which might be explained as an activation of the surface of the particles for agglomeration in the second stage. As a consequence, the second agglomeration is performed with an unexpected low consumption of water (typically 4%) for production of particles with an unprecedented combination of functional reconstitution properties and high bulk density.

The two-stage agglomeration process offers advantages which reach far beyond the mere combination of fines return and re-wet agglomeration:
- the amount of fine particles recycled is reduced, requiring less equipment and energy,
- the amount of water to be evaporated in the fluid bed is strongly reduced, requiring smaller fluid bed, less air and less energy,
- the system is highly flexible,
- the total thermal degradation of particles is strongly reduced.

The invention is further elaborated in the following description, referring to the drawing.

The only FIGURE illustrates the agglomeration device of the invention.

The premixed baby-food concentrate is led from a vessel 1 by a pump 2 to the atomizer 3 and is atomized into the spray dryer chamber 6. The atomizer 3 is a centrifugal atomizer or a set-up of pressure nozzles. Air is heated in the heat exchanger 4 and is introduced into the dryer chamber through an annular opening 20 around the atomizer 3. The bottom of the chamber has an integrated internal non-vibrating fluid bed 7. Drying air leaves the chamber through a duct 8 and fine particles are separated from the drying air in one or several cyclones 9. The fine particles from the cyclones are divided into two fractions in a controlled way by a separating device 19, e.g. a weighing band. The first fraction is conveyed pneumatically through a duct 12 and is blown into the chamber through a set of fines return tubes in the annular opening 20, close to the moist droplets from the atomizer. The second fraction is conveyed through a duct 13 to an external, vibrating fluid bed 11.

Particles from the internal fluid bed 7 are, conveyed, preferably by a dense or pulse phase conveying system via a buffer tank 10 to the vibrating fluid bed 11.

The fluid bed 11 has three sections 14, 15 and 16. In section 14 a set of two-fluid nozzles for water 17 is placed above the fluidized powder, pointing downward and forward. The powder is dried by warm air in section 15 and cooled in section 16. The final powder is conveyed to a silo (not shown) from duct 18.

The invention and the advantages obtained by using this are elucidated in more detail by the results from a series of experiments, 1–8 as were carried out by means of an APV Anhydro spray dryer system as described above and depicted in the drawing.

The diameter of the dryer is 4.3 m and the cylindrical height is 3 m. The top angle of the conical bottom is 50 degrees. The atomizer in experiment 1–3 and 5–7 was a centrifugal atomizer with a diameter of 250 mm, running 12,500 rpm. The annular air distributor had 4 tubes for fines return, directed towards the wet zone.

In experiment 4 and 8 an atomizer with a set-up of 4 adjustable high pressure nozzles was used, one of these with a coaxial surrounding tube for return of the fine particles. The internal, circular fluid bed had a diameter of 1.1 m. The height of the fluidized layer was 0.4 m.

The external fluid bed agglomerator with 1.25 $m^2$ sieve plate had three sections for respectively agglomerating, drying and cooling. In the first end of the first section were two sets of flat spray two-fluid nozzles, with the slit positioned vertically, pointing downward-forward above the powder, at an angle of 20 degrees with vertical. Powder was conveyed from the internal to the external fluid bed by a dense phase pneumatic conveyer.

In all experiments, the fat component was mixed with water, vitamins and with raw materials in powder form, i.e. casein, whey, skim milk, malto dextrine etc. The mixture was heat-treated and homogenized according to common practice and was finally evaporated to the desired total solids content in a one stage finisher before the spray drying experiments.

Examples 1–4

The formulation used were,

| | |
|---|---|
| fat: | 28.2% |
| protein: | 13.1% |
| carbohydrates | 54.0% |

The total solids contents (54%) and spray dryer inlet gas temperature (180° C.) were kept constant to facilitate comparison between experiments.

In all tests feed product temperature was 70° C., fluidization velocity in internal fluid bed was 0.5 m/s, and in the external agglomerator sections resp. 1.0, 0.4 and 0.4 m/s.

The table shows test conditions and powder analysis.

TABLE I

| Example | 1 | 2 | 3 | 4 |
|---|---|---|---|---|
| Atomizer | Centrifugal | Centrifugal | Centrifugal | Nozzles |
| Fines return | yes | no | yes | yes |
| Re-wet | no | yes | yes | yes |
| fines return to atomizer % | 30 | — | 10 | 9 |
| fines velocity m/s | 15 | — | 12 | 12 |
| re-wet water % | — | 11 | 5 | 4 |
| EFB inlet temp | 20/20/20 | 80/105/20 | 80/105/20 | 80/105/20 |
| part size in IFB (d'/n) | 225/1.9 | 110/2.0 | 200/2.0 | 220/2.1 |
| final powder part size (d'/n) | 225/1.9 | 250/2.1 | 333/3.0 | 350/3.3 |
| part moist | 2 | 1.9 | 2.1 | 1.6 |
| bulk density untap/tap | 0.34/0.43 | 0.4/0.45 | 0.43/0.51 | 0.47/0.59 |
| frac. fines < 114/85 mum | 20/15 | 15/10 | 5/3 | 4/2 |
| solubility index (ADMI) | <0.1 | <0.1 | <0.1 | <0.1 |
| wettability (IDF) | 10 | 14 | 15 | 15 |
| free fat | 3 | 2.5 | 2.5 | 2.5 |
| flowability sec | 60 | 55 | 32 | 27 |
| baby's bottle test | 1.5 | 1 | 1 | 1 |
| mech. stability | 74 | 79 | 85 | 86 |

The amount of fine particles return and of re-wet water is expressed as weight % relative to the amount of powder produced.

Standard methods for powder analysis are referred to in the table where appropriate. The method referred to as "baby's bottle analysis" is an internal standard which reflects the end user's impression of whether a powder tends to form insoluble particles in the baby's bottle.

The scale is from 1 to 5, 1 being best.

The method "mech. stability" is weight % over 150 micrometers after 10 minutes relative to after 5 minutes in a standard air sieve, expressed in %. A high number is an indicator for a stable agglomerate.

Examples 1 and 2 are performed according to prior art, i.e. example 1 is with agglomeration by fines return only and example 2 with re-wet agglomeration only. The produced powders are of very good quality, however, particle size, bulk density, flowability and reconstitution properties do not fully meet customer's demands. Further, by the re-wet agglomeration process it was necessary to spray 11% of water which subsequently had to be dried off in order to achieve the agglomeration.

In example 3 only 10% fine particles is recycles to the atomizer and 5% water is added in the fluid bed. The obtained powder shows substantial improved properties compared to prior art powders: increased bulk density, good flowability, low fraction of fines, improved reconstitution and improved agglomerate mechanical stability. The same applies to example 4, using nozzle atomization.

Examples 5–8

The experiments were in this case carried out in exactly the same way as for the above discussed experiments 1–4, but the formulation used was another one, namely

| | | |
|---|---|---|
| fat: | | 20.0% |
| protein: | | 19.1% |
| carbohydrates | | 56.1% |

TABLE II

| Example | 5 | 6 | 7 | 8 |
|---|---|---|---|---|
| Atomizer | Centrifugal | Centrifugal | Centrifugal | Nozzles |
| Fines return | yes | no | yes | yes |
| Re-wet | no | yes | yes | yes |
| fines return to atomizer % | 34 | — | 10 | 10 |
| fines velocity m/s | 15 | — | 12 | 12 |
| re-wet water % | — | 11 | 5 | 4 |
| EFB inlet temp | 20/20/20 | 80/105/20 | 80/105/20 | 80/105/20 |
| part size in IFB (d'/n) | 205/1.9 | 105/1.9 | 195/2.0 | 210/2.1 |
| final powder part size (d'/n) | 220/1.9 | 240/2.0 | 330/2.9 | 350/3.2 |
| part moist | 2 | 1.9 | 2.1 | 1.6 |
| bulk density untap/tap | 0.34/0.43 | 0.39/0.45 | 0.42/0.50 | 0.46/0.58 |
| frac. fines < 114/85 mum | 18/14 | 15/10 | 4/3 | 4/2 |
| solubility index (ADMI) | <0.1 | <0.1 | <0.1 | <0.1 |
| wettability (IDF) | 11 | 14 | 14 | 15 |
| free fat | 3 | 2.5 | 2.5 | 2.5 |
| flowability sec | 58 | 50 | 30 | 27 |
| baby's bottle test | 1.75 | 1 | 1 | 1 |
| mech. stability | 72 | 75 | 80 | 81 |

We claim:

1. A method for producing an agglomerated powder of a milk product or a mother's milk substitute product comprising:

atomizing a concentrated liquid feed of the product by an atomizer in a drying chamber to produce fine particles;

recirculating the fine particles to a wet zone around the atomizer to perform an agglomeration of the product;

accommodating the resulting agglomerates in an internal fluid bed in the drying chamber;

transferring the agglomerates from the internal fluid bed to a fluidized layer in an external fluid bed; and transferring the fine particles to a separating device which splits up the fine particles into first and second fractions, whereafter only the first fraction is recirculated to the wet zone around the atomizer in the drying chamber while the second fraction is led to the external fluid bed, where water, by a second atomizer, is atomized over the fluidized layer of agglomerates in the external fluid bed to perform a further agglomeration of the product.

2. The method according to claim 1, wherein the fine particles are split in first and second fractions by weighing in the separating device.

3. The method according to claim 2, wherein the first fraction of fine particles is introduced to the wet zone around the atomizer in the drying chamber with adjustable velocity.

4. The method according to claim 3, wherein the first fraction of fine particles is pneumatically transferred from the separating device to the drying chamber.

5. The method according to claim 4, wherein the first fraction of fine particles is from 5–15% of the total output of produced powder by weight.

6. The method according to claim 4, wherein the first fraction of fine particles is less than 40% of the total output of produced powder by weight.

7. The method according to claim 6, wherein the agglomerates leaving the internal fluid bed in the drying chamber and the second fraction of fine particles leaving the separating device are united and led to the external fluid bed.

8. The method according to claim 7, wherein the water atomized in the external fluid bed is from 4 to 5% of the total output of produced powder by weight.

9. The method according to claim 7, wherein the water atomized in the external fluid bed is less than 8% of the total output of produced powder by weight.

10. The method according to claim 9, wherein the water atomized in the external fluid bed is atomized through at least one two-fluid nozzle.

11. The method according to claim 10, wherein the product in the fluidized layer in the external fluid bed is horizontally moved from an inlet to an outlet of the fluid bed going through the steps of further agglomerating, drying and cooling of the agglomerates.

12. A plant for producing an agglomerated powder of a milk product or a mother's milk substitute product, comprising:

a) a drying chamber;

b) an atomizer arranged in the drying chamber for atomizing a concentrated liquid feed of the product in the drying chamber to produce fine particles;

c) means for recirculating the fine particles to a wet zone around the atomizer to perform an agglomeration of the product;

d) an internal fluid bed in the drying chamber for accommodating the resulting agglomerates;

e) an external fluid bed with a fluidized layer of agglomerates;

f) means for transferring the agglomerates from the internal fluid bed to the fluidized layer of agglomerates in the external fluid bed;

g) a separating device for splitting the fine particles up into first and a second fractions;

h) means for transferring the fine particles from the drying chamber to the separating device;

i) means for leading the first fraction of fine particles to the wet zone around the atomizer in the drying chamber;

j) means for leading the second fraction of fine particles to the external fluid bed; and k) a second atomizer in the external fluid bed to atomize water over the fluidized layer of agglomerates to perform a further agglomeration of the product.

13. A plant according to claim 12, wherein the separating device comprises a weighing device for weighing the first fraction of fine particles.

14. A plant according to claim 13, further comprising adjustable means for controlling the velocity of the first fraction of fine particles when introduced to the wet zone around the atomizer in the drying chamber.

15. A plant according to claim 14, further comprising means for pneumatically transferring the first fraction of fine particles from the separating device to the drying chamber.

16. A plant according to claim 15, wherein the atomizer in the external fluid bed consists of at least one two-fluid nozzle arranged inclined over the fluidized layer of agglomerates and pointing toward said layer.

17. A plant according to claim 16, wherein the fluid bed comprises means to vibrate the fluid bed and said bed between the inlet and the outlet has three sections for agglomerating, drying and cooling, respectively, the agglomerates.

* * * * *